United States Patent
Konrad et al.

(10) Patent No.: US 6,540,057 B2
(45) Date of Patent: Apr. 1, 2003

(54) ACTUATION DEVICE FOR A FRICTION CLUTCH

(75) Inventors: Andreas Konrad, Untertheres (DE); Thomas Otto, Würzburg (DE); Herbert Voit, Schweinfurt (DE); Barbara Ester, Schweinfurt (DE); Manfred Wehner, Euerbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/832,550

(22) Filed: Apr. 11, 2001

(65) Prior Publication Data

US 2001/0030097 A1 Oct. 18, 2001

(30) Foreign Application Priority Data

Apr. 14, 2000 (DE) .......................................... 100 18 633

(51) Int. Cl.[7] ............................................... B60K 23/02
(52) U.S. Cl. ................. 192/85 CA; 192/30 W
(58) Field of Search .......................... 192/85 CA, 91 A, 192/30 W, 98

(56) References Cited

U.S. PATENT DOCUMENTS

| 5,950,788 | A | | 9/1999 | Willert et al. |
| 6,029,789 | A | * | 2/2000 | Lindner et al. ......... 192/85 CA |
| 6,167,995 | B1 | * | 1/2001 | Lindner .................... 192/30 W |
| 6,298,969 | B1 | * | 10/2001 | Nagler et al. ........... 192/85 CA |

FOREIGN PATENT DOCUMENTS

| DE | 197 16 600 | 12/1997 |
| DE | 197 16 641 | 7/1998 |
| DE | 198 22 285 | 11/1999 |

* cited by examiner

*Primary Examiner*—Rodney H. Bonck
(74) *Attorney, Agent, or Firm*—Cohen, Pontani, Lieberman & Pavane

(57) ABSTRACT

The actuation device includes a pressure medium force cylinder arrangement by means of which the friction clutch can be actuated via a release member. A measuring member of a measuring arrangement detecting an actual release is in tractive force driving engagement with an associated mating member whose position represents the actual release along a measurement path, which engagement is essentially free from play.

23 Claims, 6 Drawing Sheets

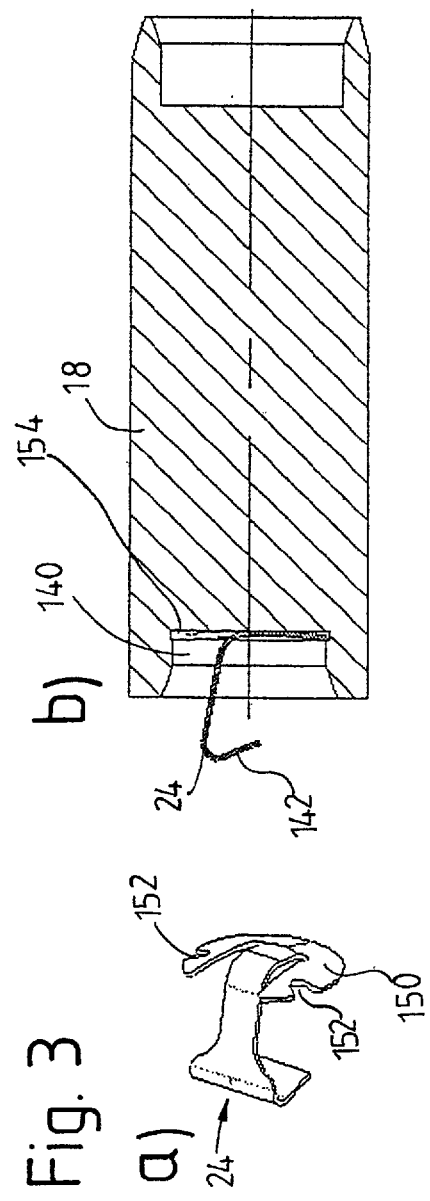
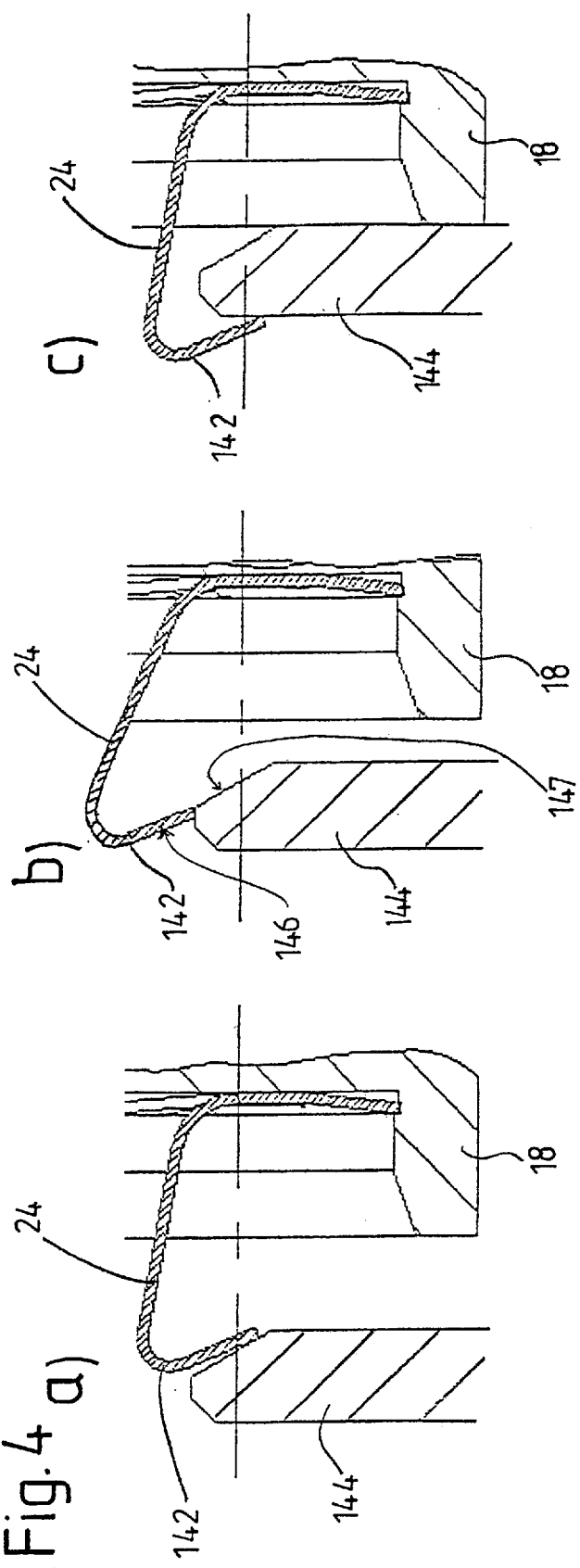

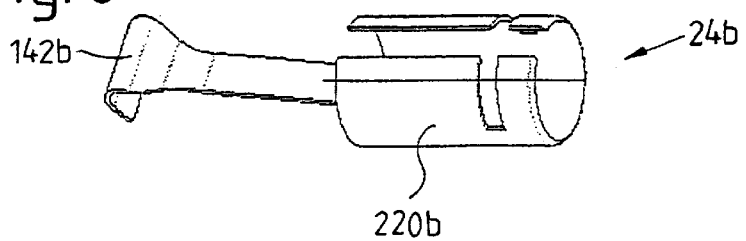
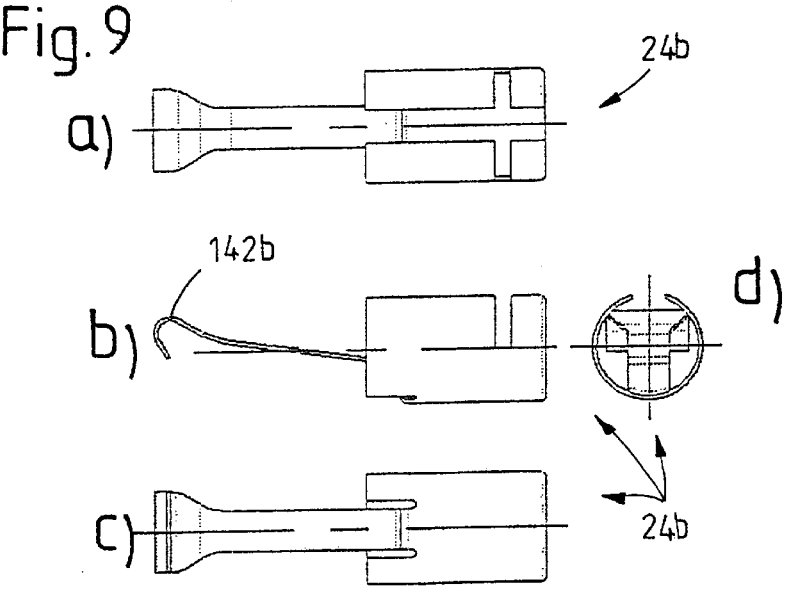
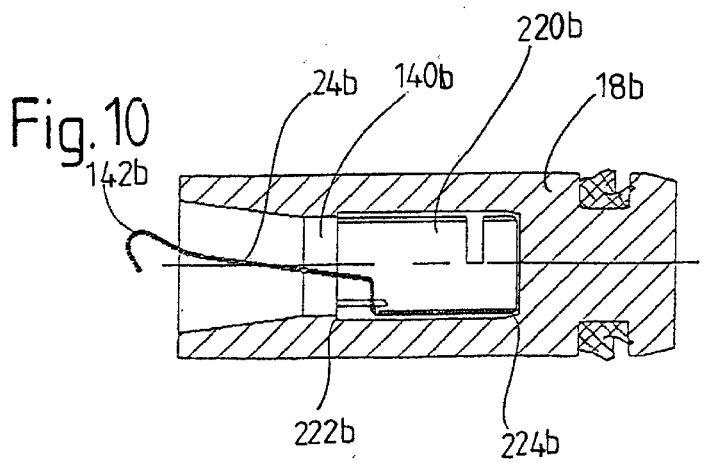

ACTUATION DEVICE FOR A FRICTION CLUTCH

BACKGROUND OF THE INVENTION

1. Field of the Invention

The present invention is directed to an actuation device for a friction clutch which is arranged in the drivetrain of a motor vehicle between a drive unit and a transmission, comprising a pressure medium force cylinder arrangement by means of which the friction clutch can be actuated via a release member. A measuring arrangement detects an actual release and has a measuring member which is movement-coupled or can be movement-coupled with a mating member whose position represents the actual release. In particular, the invention is directed to an actuation device for a friction clutch arranged in the drivetrain of a motor vehicle between a drive unit and a transmission, comprising a release member for actuating the friction clutch, which release member is associated with a pressure medium force cylinder arrangement and is displaceable along a release path. A control/regulating valve arrangement is associated with the pressure medium force cylinder arrangement and pressure medium source and actuates the pressure medium force cylinder arrangement by a command variable and an actual quantity representing a position of the release member or depending on this position, a measuring arrangement which is associated with the control/regulating valve arrangement and serves to detect the actual quantity or a measured quantity dependent upon the actual quantity. The measuring arrangement has at least one measuring member which is arranged so as to be movable along a measurement path and which is in a movement coupling connection or can be brought into a movement coupling connection with a mating member formed by the release member or by a member of the actuation device or friction clutch which varies in position and whose position represents the actual quantity or measurement quantity.

2. Description of the Related Art

DE 198 22 285, to which U.S. Pat. No. 6,167,995 corresponds, and DE 197 16 641 disclose special actuation devices of the type mentioned in the introduction in which a measurement piston element of a hydraulic measurement cylinder (DE 198 22 285 A1) serving as measuring arrangement or a valve element of the control/regulating valve arrangement (DE 197 16 641 A1) serving at the same time as a measuring arrangement has a lateral groove in which a flange portion of a pneumatic ring piston engages, so that the measurement piston element and the pneumatic ring piston are driven along by tractive force and pressure force so as to produce the movement coupling connection. Such a construction of the movement coupling connection is disadvantageous in that in the case of a removable structural unit containing the measuring arrangement and possibly the control/regulating valve arrangement, the respective measuring member and the pneumatic piston element, after removal of the structural unit, must be moved into and held in axial positions matching one another exactly when the structural unit or an exchangeable structural unit is reinstalled so that the flange portion of the pneumatic ring piston can engage in the groove of the measuring member and so that the movement coupling connection can be produced. This is made even more difficult when no wear compensation is provided and the axial position of the pneumatic ring piston element corresponding to an engaged clutch wanders and different axial positions of the measuring member for the assembly and production of the movement coupling connection must be adjusted for different wear states of the friction clutch.

DE 198 22 285 and DE 197 16 641 disclose special actuation devices of the type mentioned in the introduction in which a measurement piston element of a hydraulic measurement cylinder (DE 198 22 285 A1) serving as measuring arrangement or a valve element of the control/regulating valve arrangement (DE 197 16 641 A1) serving at the same time as a measuring arrangement has a lateral groove in which a flange portion of a pneumatic ring piston engages, so that the measurement piston element and the pneumatic ring piston are driven along by tractive force and pressure force so as to produce the movement coupling connection. Such a construction of the movement coupling connection is disadvantageous in that in the case of a removable structural unit containing the measuring arrangement and possibly the control/regulating valve arrangement, the respective measuring member and the pneumatic piston element, after removal of the structural unit, must be moved into and held in axial positions matching one another exactly when the structural unit or an exchangeable structural unit is reinstalled so that the flange portion of the pneumatic ring piston can engage in the groove of the measuring member and so that the movement coupling connection can be produced. This is made even more difficult when no wear compensation is provided and the axial position of the pneumatic ring piston element corresponding to an engaged clutch wanders and different axial positions of the measuring member for the assembly and production of the movement coupling connection must be adjusted for different wear states of the friction clutch.

In order to facilitate assembly of the structural unit, it would be conceivable to move the pneumatic piston (generally at least one piston of the pressure medium force cylinder arrangement) and the measuring member for the assembly into a defined respective position, for example, the moved in end position, for instance, by means of a special lever mechanism provided for this purpose, e.g., through the clutch housing opening. However, a lever mechanism of this kind does not seem advantageous with respect to the elaborate construction necessitated by it.

The known solution with a groove in the measuring member, possibly the measurement piston element, which groove receives the flange portion of the actuation piston (release piston), is also disadvantageous insofar as the axial dimensioning of the groove and that of the flange portion can only be adapted to one another in a relatively expensive manner with respect to manufacturing technique to produce the engagement between the groove and flange portion without difficulty on the one hand and a tractive force driving engagement and pressure force driving engagement essentially without play between the piston and measurement piston element. Therefore, in general, separate steps are required in order to provide a displacing engagement between the measuring member and release piston essentially without play. For example, additional spring elements could be inserted into the groove which pretension the annular flange of the release piston and the measuring member in the direction of mutual contact at a surface of the measuring member limiting the groove axially and accordingly eliminate the axial movement play between the release piston and measuring member. However, the additional spring elements mean increased production costs and, beyond this, make it more difficult to introduce the annular flange of the release piston into the groove during assembly of the structural unit.

SUMMARY OF THE INVENTION

In contrast, one object of the present invention is to simplify the production of the movement coupled connection between the measuring member and the mating member. According to a first aspect of the invention, the measuring member is brought into a tractive force driving engagement with the mating member so as to be essentially free from play in that the measuring member and the mating member approach one another along the measurement path.

According to the invention, it is not required that the measuring member and the mating member are brought into and held in a defined axial position relative to one another in order to produce the movement coupled connection. Rather, the movement coupled connection can be produced by the movement of the measuring member and/or mating member along the measurement path, for example, after the assembly of a structural unit having the measuring arrangement, In the case of a hydraulic measurement cylinder, for example, in that a measurement piston element serving as measuring member moves out in the direction of the mating member which, for example, is formed by a portion of a pressure medium force piston, for example, of a pneumatic ring piston. Accordingly, it is possible to decouple the assembly of the structural unit from the production of the movement coupling connection, so that the assembly of the structural unit is substantially simplified.

The inventive idea is not only applicable for actuation devices in which the measurement path and the release path both extend in an essentially straight line and are essentially parallel to one another or to an axis of the friction clutch. Other geometries are also possible. The construction of the release member is also not at issue. As a rule, this release member is a release bearing arrangement for actuating the friction clutch and, with reference to an axis of the friction clutch, is movable essentially coaxial to the friction clutch, as is also the case in the prior art solutions mentioned above. The drive unit is generally an internal combustion engine. Depending on the construction of the transmission, the friction clutch can be a single clutch or multiple clutch (especially a double clutch in case of a transmission with two input shafts).

In a preferred embodiment, the measuring arrangement comprises at least one hydraulic measurement cylinder which detects the actual quantity or the measurement quantity and to which the measuring member is assigned. As in the prior art discussed above, the measuring member can comprise a measurement piston element of the measurement cylinder. A hydraulic measurement cylinder arrangement serving as measuring arrangement is taken into consideration particularly in connection with a control valve arrangement working on the principle of a pressure scale.

Alternatively, it is possible that the measuring arrangement is based on other working principles. For example, the measuring arrangement can comprise a sensor, for example, a potentiometer sensor or a magnet sensor, which emits an electric signal and detects the actual quantity or the measurement quantity and to which the measuring member is assigned. For example, the measuring member can comprise an input element of the sensor, for example, in the case of a linear potentiometer, a sliding element of the potentiometer.

In general, the pressure medium force cylinder arrangement is arranged inside a housing cover containing the friction clutch and may include a pressure medium force ring cylinder, preferably a pneumatic force ring cylinder, which surrounds a transmission input shaft. In this case, it is preferable that a measuring unit having the measuring member, possibly the measurement piston element, is constructed as a structural unit which is separate from the pressure medium force cylinder arrangement and which is arranged, at least in part, inside the housing cover, but is preferably accessible from the outside when the housing cover is connected with the drive unit and transmission and, most preferably, can be removed and installed. The structural unit can be mounted at the pressure medium force cylinder arrangement.

When, for purposes of installation and removal, the structural unit is to be moved along a mounting path leading through a housing cover opening and laterally directed with reference to the measurement path, assembly of the structural unit is nevertheless not difficult, since the movement coupling connection can be produced independent from the mounting of the structural unit. In order to facilitate removal of the structural unit, the tractive force driving engagement (and, where appropriate, a pressure force driving engagement) and, therefore, the movement coupled connection can be released (canceled), preferably by means of a lateral movement of the structural unit along the mounting path occurring while the structural unit is removed.

With respect to the structural unit, it is particularly preferred that this structural unit is an integral measurement and control/regulating valve unit which also comprises the control/regulating valve arrangement.

With regard to the movement coupling connection, it is suggested according to a first solution that the tractive force driving engagement is carried out by means of a catch coupling connection or snap-in coupling connection acting between the measuring member and the mating member.

The catch coupling connection or snap-in coupling connection preferably has a catch spring element or snap-in spring element which is fixed, preferably in a detachable manner, at one of either the measuring member or the mating member. The element is locked with an associated mating engagement element of the other one of either the measuring member or the mating member, or is in a snap-in connection or can be locked with the mating engagement element in the course of mutual approach along the measurement path or can be brought into a snap-in connection. In the locked or snapped in state of the mating engagement element, the element is elastically pretensioned in the direction of mutual contact of the measuring member and mating member for providing the essentially play-free tractive force driving engagement. The spring element is preferably fixed to or in the measuring member. For this purpose, it is suggested by way of further development that the spring element is inserted into a cutout of the measuring member which opens in the direction of the mating member and is preferably fixed therein by catching or snapping in and has an engagement portion which projects out of the cutout in direction of the mating member and which engages behind the counter-engagement element. Another possibility consists in that the spring element is fixed to an end portion of the measuring member which is closer to the mating member, preferably by locking or fixedly snapping in, and has an engagement portion which projects over the end portion in direction of the mating member and engages behind the mating engagement element.

In order to fix the spring element to the measuring member or in the measuring member, it has proved advantageous when the spring element has a snap-ring-like fastening portion which engages with the measuring member. The spring element can then be constructed in a particularly simple manner. In the event that the snap-ring-like fastening portion is arranged in the cutout and acts at the inner surface of the latter, the spring element can be mounted in the measuring member a particularly simple manner with a tubular mounting tool. If required, the spring element could also be removed again with a disassembling tool, e.g., a pincer-like tool.

According to another possible construction, the spring element has a body portion which is arranged in the cutout, generally extends along an axis of the measuring member and is constructed in a flat manner, which body portion acts at an inner surface of the cutout by two side edges defining the body portion with respect to a first lateral direction and preferably has at least one leaf spring portion which projects from the body portion in a second lateral direction, elastically supports the body portion at the inner surface and/or is fixed in the cutout, preferably snaps in behind a holding collar of the measuring member. A spring element of this kind can be produced in a particularly economical manner, for example, by stamping and forming a sheet material, preferably leaf spring material, having spring characteristics. Close tolerances can then be maintained economically in the width of the spring element with respect to the cutout, or bore hole as the case may be, of the measuring member in order to ensure a defined reference position, possibly a middle position, of the spring element in the measuring member. In order that the spring element can sit in the measuring member without play with respect to the relative axial position, the body portion can have, in an end area which is farther from the engagement portion and arranged in the cutout, at least one spring portion which acts elastically at the measuring member and which must be overcome when the spring element is mounted in the cutout and then elastically pretensions the body portion in the direction of an elastic engagement of the leaf spring portion with the holding collar.

According to another possible construction, the spring element has a spring tube portion which is arranged in the cutout, acts elastically at an inner surface of the cutout accompanied by radial pretensioning and is preferably snapped in behind a holding collar of the measuring member. The radial pretensioning serves to ensure freedom from play between the spring element and the measuring member. With respect to freedom from play, it is suggested in a further development that the spring pipe portion engages via an inclined surface with the inner surface of the cutout in such a way that the spring pipe portion is elastically pretensioned in the direction in which the spring pipe portion contacts the holding collar. For example, the measuring member can have an inclined surface arrangement in a rear region of the cutout acted upon by the spring pipe portion.

According to another approach, it is suggested that the tractive force driving engagement is carried out by means of a magnetic force coupling connection acting between the measuring member and the mating member. For example, the magnetic force coupling connection can comprise at least one magnet element fixed to either the measuring member or mating member, which magnet element cooperates with an associated magnetically attractable portion or mating magnet element of the other member in order to provide the tractive force driving engagement which is essentially free from play.

Producing the movement coupling connection by means of the magnetic force coupling connection is particularly advantageous in that a rotation of the release piston can occur successively in operation. When a portion of the release piston, possibly an annular flange of the piston as in the prior art, serves as a mating member, this can lead to problems when the movement coupling connection does not permit this rotating movement or permits it only accompanied by transmission of tilting forces to the measuring member. Such tilting forces or tilting moments, for example, on a measurement piston element serving as measuring member, could lead to measurement errors and—in case of the measurement piston element—for example, to a self-locking of the hydraulic measurement cylinder. In spite of the high attraction forces in the direction along the measurement path, the magnetic force coupling connection allows relative transverse movements between the mating member and the measuring member due, for example, to a rotation of the release piston, without excessive transverse forces being transmitted to the measuring member. In order to minimize transverse forces of this kind, the magnet element and/or the magnetically attractable portion or magnet element can be constructed with a sliding surface at which the magnet element and the magnetically attractable portion or the mating magnet element engage with one another. Generally, it is suggested that means are associated with the measuring member and/or mating member for reducing counterforces acting against a transverse or rotational relative movement between the measuring member and mating member.

Particularly in the case of the catch coupling connection or snap-in coupling connection (but also possibly in differently constructed movement coupling connections such as the magnetic force coupling connection), it may be necessary to maintain a definite reference orientation, possibly a defined reference rotational position, of the measuring member relative to the mating member at least during the mounting process and while the movement coupling connection is being made. To ensure this, corresponding means can be provided. If required, the means can provide a defined angular position of the measurement piston element in a cylinder space of the measurement cylinder insofar as one exists. Further, the means can provide a defined angular position of the spring element, if any, relative to the measuring member, possibly the measurement piston element.

According to a second aspect of the invention, it is suggested for the actuation devices mentioned in the beginning that the measuring member is movement-coupled or can be movement-coupled with the mating member by means of a catch coupling connection or snap-in coupling connection acting between the measuring member and mating member and/or by mean of a magnetic force coupling connection acting between the measuring member and the mating member. In the movement-coupled state, the measuring member and the mating member can be in a tractive force driving engagement and/or rotational force driving engagement with one another essentially without play. The actuation device according to the invention can have further features of the actuation devices according to the first aspect of the invention as indicated above.

The invention is further directed to a drivetrain for a motor vehicle comprising a drive unit (possibly an internal combustion engine), a transmission and a friction clutch arranged between the drive unit and the transmission, and comprising an actuation device according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows, in partial FIG. 3a, a spring element which serves for the movement coupling of a measurement piston of a hydraulic measurement cylinder of the actuation device and of a ring piston of the pneumatic force cylinder and, in partial FIG. 3b, the measurement piston including spring element fixed thereto without the rest of the components of the actuation device;

FIG. 4 shows, in partial FIGS. 4a, 4b and 4c, a sequence of instantaneous states of the actuation device in the course of the production of a movement coupling connection between the measurement piston and the ring piston of the pneumatic force cylinder;

FIG. 8 shows another embodiment example of a spring element which is suitable for the movement coupling of a measuring member and an associated mating member;

FIG. 9 shows, in partial FIGS. 9a, 9b and 9c, the spring element of FIG. 8 in three side views and, in partial FIG. 9d, the spring element in a viewed in direction toward an axial end;

FIG. 10 shows the spring element mounted in a cutout of a measurement piston.

DETAILED DESCRIPTION OF THE PRESENTLY PREFERRED EMBODIMENTS

Figure 1:
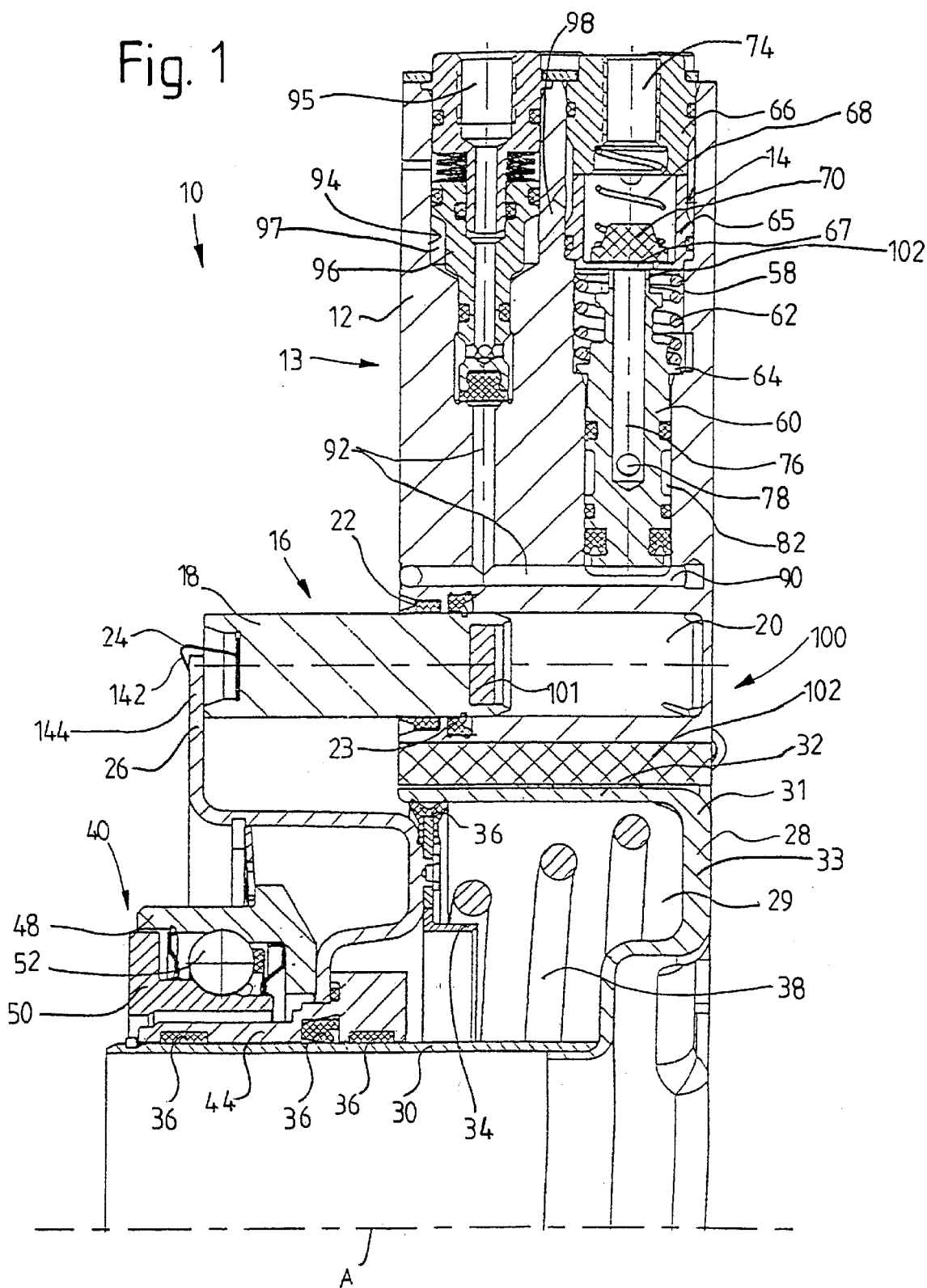
FIG. 1 shows a partial longitudinal sectional view of an actuation device for a motor vehicle friction clutch with a pressure medium force cylinder, especially a pneumatic force cylinder, in the moved out state.

First, the basic construction and manner of operation of an actuation device 10 (which can also be described as a release arrangement 10) will be described with reference to FIGS. 1 and 2 according to an embodiment example such as is used, for example, in utility vehicles. The actuation device 10 is constructed in such a way that it surrounds an axis of rotation A of a motor vehicle friction clutch, not shown, essentially concentrically and various components of the same are constructed annularly and surround the axis of rotation A.

Visible on the radial outer side is a housing 12 of the actuation device 10 in which is integrated a valve arrangement 14, described in the following. A measuring arrangement 16 is located radially inside the valve arrangement 14 and has a measurement piston 18 which is displaceable in the direction of the axis of rotation A and which is arranged in a measurement cylinder 20 which is open on one axial side and formed in the housing 12. Sealing elements 22, 23 which seal the measurement cylinder 20 act between the measurement piston 18 and an inner circumferential wall of the cylinder 20.

At its end projecting out of the cylinder 20, the measurement piston 18 engages in a displaceable manner with an annular pressure medium force piston 26 (which can also be defined as a release piston 26) by means of a spring element 24 which will be described in the following. The pressure medium force piston 26 is part of a pressure medium force cylinder arrangement 28 which can also be referred to as a release cylinder arrangement 28. In the present case, the pressure medium force cylinder arrangement is a pneumatic force cylinder arrangement. The release piston 26 can be displaced in the direction of the axis of rotation A. A ring cylinder space 29 is defined by a tube part 30 and an annular wall part 31 with a radial outer wall portion 32 and a base portion 33 and a piston element 34 of the release piston 26, which piston element 34 engages in the ring piston space 29. Various sealing elements 36 which seal the ring cylinder space 29 so as to be tight against pressure medium, particularly pneumatically tight, act between the release piston 26, especially its piston element 34, on one side and the pipe part 30 and wall part 31 on the other side. A pretensioning compression spring 38 is received in the ring cylinder space 29 and pretensions the release piston 26 in the direction of a stop of a release bearing 40 at an associated diaphragm spring arrangement or plate spring arrangement or the like of the friction clutch, this release bearing 40 being fixedly coupled to the release piston 26. The release bearing 40 comprises two bearing shells 48, 50, known per se, between which are arranged bearing balls. The bearing shell 48 is coupled with the release piston 26 and bearing shell 50 is rotatable about the axis of rotation A with respect to these structural component parts and cooperates with spring tabs, or the like, of the diaphragm spring arrangement or plate spring arrangement for releasing the clutch.

It should be noted that, in the present embodiment form, the actuation device 10 is constructed for working together with a pushed clutch, but it would be possible to convert for working with a pulled clutch without extensive structural modifications.

The valve arrangement 14 is constructed in the manner of a pressure scale. A valve slide 60 is received so as to be displaceable in a bore hole or opening 58 in the housing 12. The valve slide 60 is pretensioned toward the inside by a pretensioning spring 62 and is supported on the inner side by a flange 64 at a shoulder of the opening 58. The pretensioning spring 62 is supported externally at insert parts 65, 66 which are inserted into the opening 58. The cup-like insert part 65 has an opening 67 in its bottom on which a cover element 70 fits under pretensioning by a spring 68. The spring 68 is supported externally at the sleeve-like insert part 66 which is securely inserted into the bore hole 58. The insert part 66 has an opening 74 for supplying compressed air.

The slide 60 has an opening or bore hole 76 which opens toward the outside (toward the cover element 70) and opens on the inside to a circumferential groove 82 via opening portions 78. The circumferential groove 82 communicates with a vent opening, not shown. The inner end of the slide 60 defines a hydraulic chamber 90 which is connected to or can be connected to a hydraulic actuation system via hydraulic lines 92 penetrating the housing and a safety valve 94 having a hydraulic connection 95. This hydraulic actuation system can comprise, for example, a master cylinder coupled with a clutch pedal, by means of which master cylinder hydraulic fluid is introduced, via line 92, into the hydraulic chamber 90 when the clutch pedal is depressed. The hydraulic chamber 90 communicates in a fluid connection with the measuring arrangement 16, i.e., with the cylinder 20 of the latter, via a line portion which is not shown in the sectional view. Further, a pneumatic line, not shown in the sectional view, is formed in the housing 12 and provides a pneumatic connection between the portion of the bore hole 58 containing the pretensioning spring 62 and the annular cylinder space 29 of the release cylinder 28.

It should be mentioned with respect to the safety valve 94 that it has a valve slide 96 which is pretensioned by a spring and which defines an annular space 97 which is supplied with compressed air via a pneumatic connection 98 proceeding from connection 74 when compressed air is present at connection 74. If the pressure of the compressed air present at connection 74 is sufficient, the valve slide 96 is displaced, in opposition to the spring pretensioning acting upon it, or held in an open position in which the valve slide 96 produces a hydraulic connection between the hydraulic connection 95 and the hydraulic lines 92. When there is no pneumatic pressure at the connection 74 or the pressure is not sufficient, the valve slide 96 closes the hydraulic connection so as to prevent damage to the valve 14 due to excessive hydraulic pressures.

Figure 2:
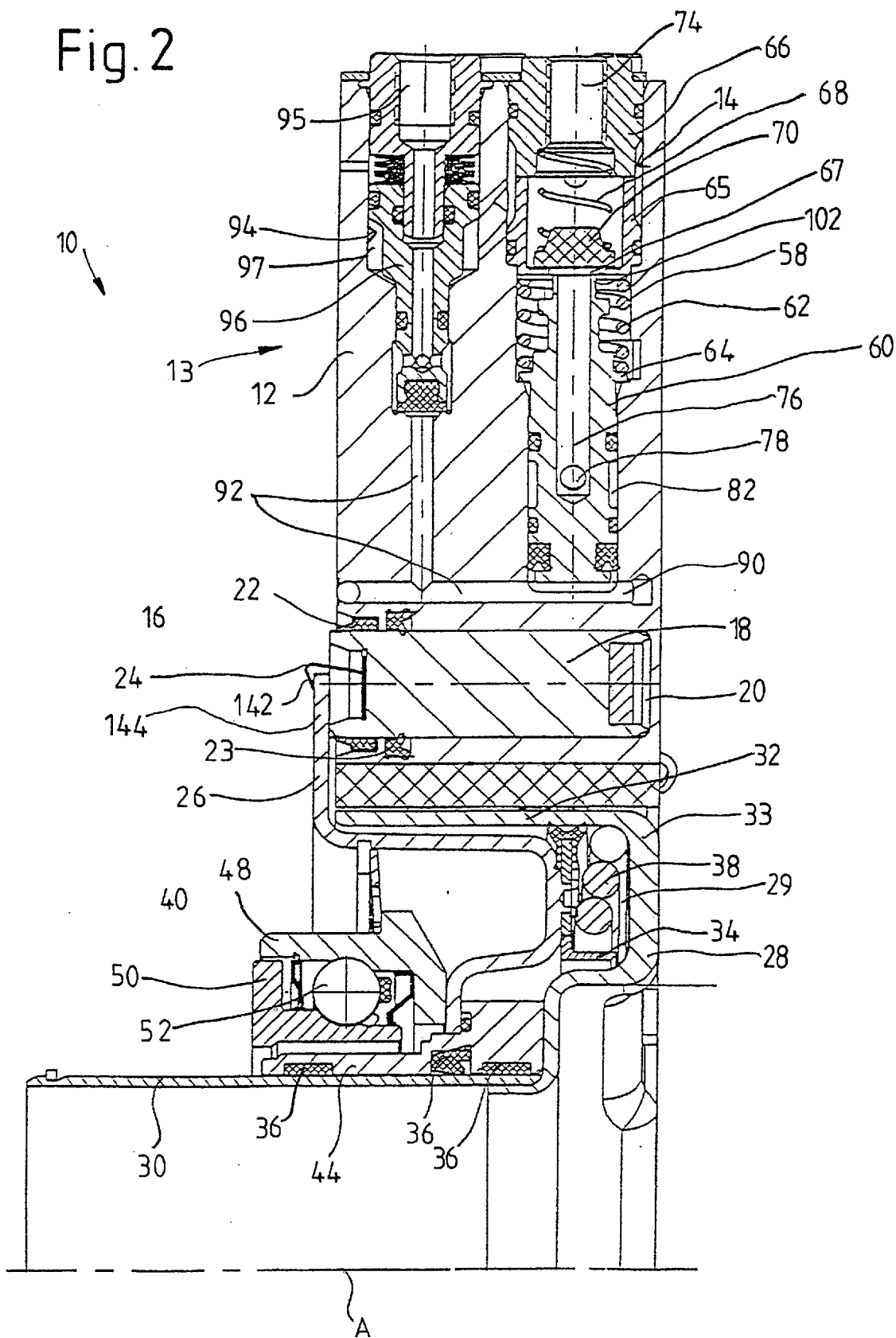
FIG. 2 shows the actuation device of FIG. 1 in the moved in state of the pneumatic force cylinder.

The manner of operation of the actuation device 10 of FIGS. 1 and 2 is described in more detail in the following.

In the engaged state of the clutch, the release piston 26, the measurement piston 18, the slide 60 and the valve body 70 are in the positions shown in FIG. 2. This means that the slide 60 is pretensioned in its innermost position, so that the outer end of the slide 60 is lifted (toward the inside) from the cover element 70 sitting on the bottom of the insert part 65 and a venting connection is accordingly produced between the annular cylinder space 29 and the vent opening via the above-mentioned pneumatic line in the housing 12, the portion of the bore hole 58 containing the spring 62, the bore hole 76 in the slide 60, the openings 78 and the circumferential groove 82. Accordingly, there is no pressure in the ring cylinder space 29 through which the release piston 26 could be pressed toward the left-hand side with reference to FIG. 2.

When hydraulic fluid volume is guided into the hydraulic chamber 90 via connection 95 and lines 92 in order to carry out a release process, for example, by depressing a clutch pedal and thereby displacing a certain volume of hydraulic fluid in a master cylinder of the clutch pedal and directing it to connection 95, this results in the slide 60 being displaced outward. As a result of this, a portion 102 of the slide 60 which engages in the opening of the insert part 65 fits on the cover element 70 and, by closing the bore hole 76 toward the outside, interrupts the venting connection between the ring cylinder space 29 and the vent opening. If the hydraulic pressure is further increased, i.e., if more hydraulic fluid is displaced in the hydraulic chamber 90, the slide 60 pushes the cover element 70 outward against the pretensioning of the spring 68, so that the cover element 70 is lifted from the base of the insert part 65 and accordingly releases a pneumatic connection between the connection 74 and the portion of the bore hole 58 containing the spring 62 and accordingly the ring cylinder space 29, so that compressed air can flow into the ring cylinder space 29. This increases the pressure in the ring cylinder space 29 and the release piston 26 is displaced against the pretensioning of the diaphragm spring or the like toward the left with reference to FIG. 2. In so doing, the release piston 26 carries along the measurement piston 18 by means of the spring element 24, so that the hydraulic fluid contained in the hydraulic chamber 90 can flow into the free space formed in the measurement cylinder 20.

Since the hydraulic fluid which is under pressure can flow out of the hydraulic chamber 90, the pressure in the hydraulic chamber 90 decreases when the clutch pedal or the like is held constant, so that the slide is displaced inward again, specifically to the extent that the cover element 70 again closes the through-opening 67 in the base of the insert part 65. A state of equilibrium is then reached in which the slide 60, the release piston 26 and, accordingly, in a compulsory manner, also the measurement piston 18 retain their respective positions or locations.

The volume which is made available in the measurement cylinder 20 by the displacement of the measurement piston 18 and in which the hydraulic fluid is received from the hydraulic chamber 90 is a measure of the axial positioning of the release piston 26 and, therefore, for the release position. This means that a determined volume of space created in the measuring arrangement 16 and a correspondingly determined release position of the release piston 26 is associated with every determined change in pressure in the actuation arrangement, i.e., in the master cylinder, which causes a displacement of a determined fluid volume in the direction of the hydraulic chamber 90. The valve arrangement 14 regulates the supply of compressed air to the ring cylinder space 29 corresponding to the actual release position of the release piston 26 which is accordingly determined and corresponding to the hydraulic fluid volume which forms a command variable and which is displaced by the master cylinder of the actuation device. Finally, the valve arrangement 14 regulates the compressed air supply to the ring cylinder space 29 depending on the hydraulic pressure prevailing in the hydraulic chamber 90, this hydraulic pressure being determined in turn by the detected actual release position and the extent of actuation of the master cylinder, that is, the command variable.

When the actuation pedal or the like is released subsequently, the hydraulic fluid contained in the hydraulic chamber 90 can flow out via lines 92 and connection 95, so that the slide 60 can now be displaced further inward and be lifted from the cover element 70 in inward direction by its portion 102. The venting path described above is then opened, so that the release piston 26 can move toward the right with reference to the view in FIG. 1, either into its engagement position, shown in FIG. 2, or again into a position in which a state of equilibrium takes place, as was described above.

It should be noted that a sensor 100 which magnetically detects the inward and outward movement of the measurement piston 18 and which comprises a magnet element 101 at the inner end of the measurement piston 18 and a coil body 102 is provided in the present embodiment example. In the present embodiment example, the sensor serves only as a wear sensor for monitoring a state of wear in the friction clutch. However, in contrast to the present embodiment example, it is also conceivable to provide an electrically controllable valve in place of the pressure scale valve 14 and to use a sensor like sensor 100 for detecting the actual release position.

The following relates to the assembly and disassembly of the measurement cylinder/control valve unit is comprising the housing 12, valve arrangement 14, safety valve 94 and measuring arrangement 16. The measurement and control valve unit is constructed as a structural unit which is separate from the release cylinder 28 and is detachably mounted at the release cylinder 28. For maintenance and repair purposes, or for exchanging, if required, this measurement cylinder/control valve unit can be removed from a housing cover containing the friction clutch, release cylinder and measurement cylinder/valve unit through a housing cover opening in lateral direction without disconnecting the drivetrain comprising a drive unit, possibly an internal combustion engine, the friction clutch and transmission. Accordingly, the housing cover can remain connected with the drive unit and transmission.

The movement coupled connection between the release piston 26 and the measurement piston 18 selected in the embodiment example in FIGS. 1 and 2 facilitates the disassembly of the measurement and control valve unit or measurement cylinder/control valve unit 13, which is carried out toward the radial outside (at top in FIGS. 1 and 2) with reference to the axis of rotation A. This movement coupled connection is produced by means of the spring element 24 which is fixed in a cutout 140 constructed in the outer end area of the measurement piston 18 and opening in the direction of the friction clutch and has a snap-in hook portion 142 which engages around an annular flange portion 144 of the release piston 26 from the radial outer side and presses it against the end of the measurement piston 18. This ensures that the release piston 26 carries along the measurement piston 18 during an outward movement (from right to left in FIGS. 1 and 2). In this way, a tractive force driving engagement is produced between the measurement piston 18 and the release cylinder 26. Moreover, there is a pressure force driving engagement between these components, since the release piston 26 drives the measurement piston 18 during an inward movement (from left to right in FIGS. 1 and 2).

When the structural unit 13 is removed, this engagement is easily canceled in the course of moving the structural unit 13 out in the radial outward direction, since the spring element 24 permits a relative movement of this kind between the measurement piston 18 and release piston 26. The snap-in hook portion 142 then slides in the radial outward direction away from the annular flange portion 144.

When the structural unit 13 is installed again, this can advisably be done in such a way that the structural unit 13 is initially mounted at the release cylinder 28 before the movement coupling connection between the measurement piston 18 and the release piston 26 is produced again. For this purpose, the measurement piston 18 is preferably moved completely into the measurement cylinder 20 and the release piston is moved and held in an at least slightly moved out position if required. The assembly of the structural unit 13 is particularly simple when the snap-in hook portion 142 and the annular flange 144 are at an axial distance from one another in relation to the axis A during a simple assembly process. If the structural unit 13 (or an exchanged structural unit 13) is mounted (again) at the release cylinder 28, the release piston 26 can again be left alone insofar as it was held at a certain axial position previously for the assembly process.

An axial relative movement of the measurement piston 18 and annular flange 144 toward one another is sufficient for producing or reproducing the movement coupling connection between the measurement piston 18 and the release piston 26. This axial relative movement can be carried out by means of the diaphragm spring arrangement or the like acting on the release bearing 40 and/or by means of pressure forces of a hydraulic fluid contained in the measurement cylinder 20, which pressure forces act on the measurement piston 18. If required, the hydraulic connection 95 is (again) connected to the hydraulic system.

FIG. 4 shows a sequence of states in the course of producing the movement coupling connection while producing a tractive force driving engagement between the measurement piston 18 and the annular flange portion 144 of the release piston 26 which is essentially free from play. The snap-in hook portion 142 has a stop slope 146 which comes into contact with a radial outer edge of the annular flange 144 as the measurement piston 10 and annular flange 144 approach one another and the spring element 24 is deflected radially outward, so that the snap-in hook portion 142 can snap in or catch in behind the annular flange portion 144 and the tractive force driving engagement is accordingly produced. As is shown in FIG. 4, this can be supported by a stop slope 147 at the radial outer edge area of the annular flange 144.

The production of the movement coupling connection in the manner described above can be carried out with pneumatic pressure at the pneumatic connection 74. The tractive force driving engagement and accordingly the movement coupling connection is effected automatically to a certain extent in the first actuation of the release cylinder 28 by supplying a hydraulic fluid volume serving as command variable via the hydraulic connection 95 which leads to a hydraulic pressure in the measurement cylinder 20 that moves the measurement piston 18 outward.

In order to produce the tractive force driving engagement by means of the spring element 24, it is essential that the spring element occupies the position shown in FIGS. 1 to 4 relative to the annular flange portion 144. This is ensured by means of two steps. First, the measurement piston 18 has a cross-sectional shape which prevents a rotation of the piston 18 in the measurement cylinder 20 about its longitudinal axis, so that the piston 18 reliably retains its relative angular position in the measurement cylinder 20. On the other hand, the spring element 24 has cutouts 152 in a snap ring-like portion 150, wherein associated projections of the measurement piston 18 within the cutout 150 engage in the cutouts 152 when the spring element 24 is inserted into the cutout 140. The spring element 24 can only be mounted in a determined angular position in relation to the piston 18, for example, by means of a tubular mounting tool. The snap ring-like portion 150 then engages in an annular groove 154 of the cutout 140 and is held by the projections engaging in the cutout 152 so as to be fixed with respect to rotation relative to the latter. The spring element 24 is securely fixed in the cutout 140 with respect to axially acting forces by the engagement of the portion 150 in the annular groove 154, wherein the portion 150 is slightly curved in radial direction, so that the portion 150 is axially cut in between a collar defining the annular groove on one side and a base of the cutout 140 defining the annular groove on the other side. In this way, the spring element 24 is held in the cutout 140 without play. If required, the spring element 24 can be removed, e.g., by means of safety pliers.

Alternative embodiment forms of the spring element producing the tractive force driving engagement with a correspondingly modified measurement piston are shown in FIGS. 5 to 7 and 8 to 10.

Figure 5:
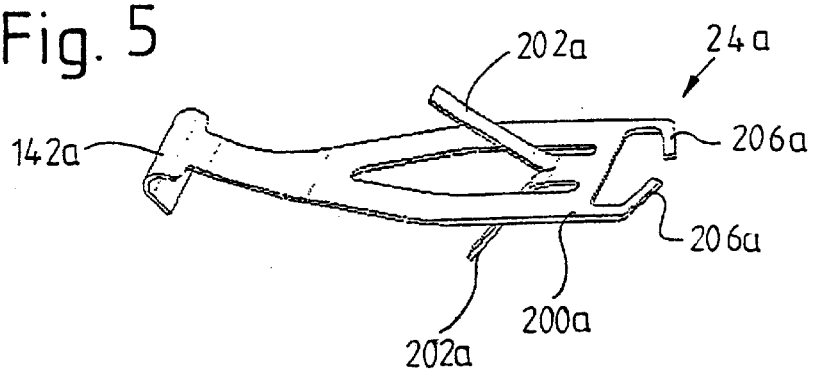
FIG. 5 shows an alternative embodiment form of a spring element suitable for the movement coupling of a measuring member, possibly a measurement piston, with an associated mating member, possibly a pressure medium piston.
Figure 6:
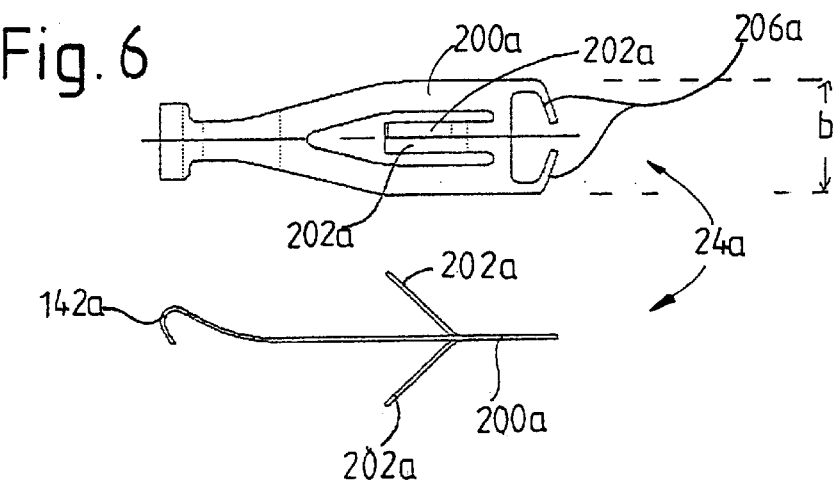
FIG. 6 shows, in partial FIGS. 6a and 6b, the spring element of FIG. 5 in two side views.
Figure 7:
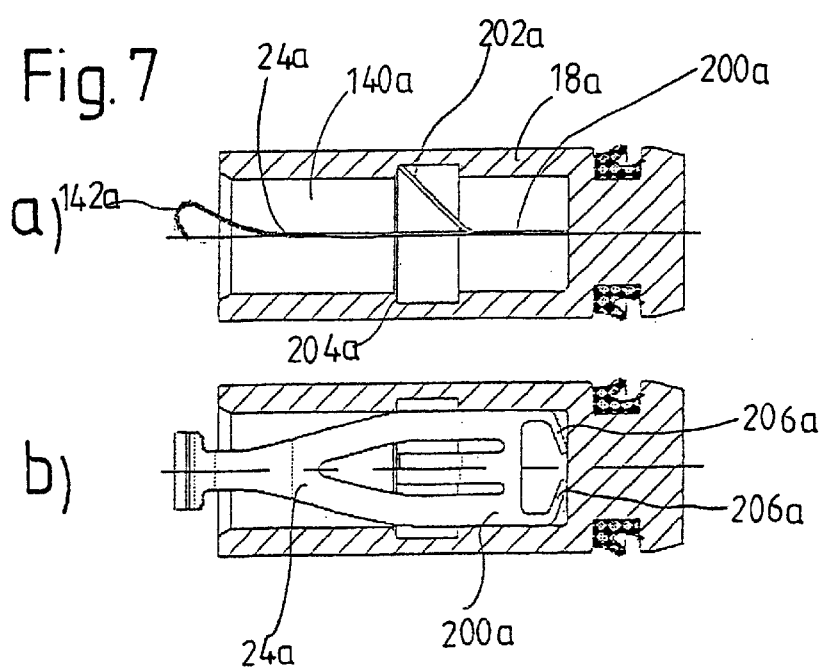
FIG. 7 shows, in partial FIGS. 7a and 7b, the spring element of FIG. 5 in the state in which it is mounted in a cutout of a measurement piston.

FIG. 5 shows a leaf spring-like spring element 24*a* which is constructed so as to be essentially flat (see the side views shown in FIG. 6*b*) and arranged with a flat body portion 200*a* in a cutout 140*a* extending along a large part of the length of the measurement piston 18*a*. A snap-in hook portion 142a having a stop slope like the spring element 24 projects outward out of the cutout 140 and, like the snap-in hook portion 142, cooperates with the associated annular flange portion of the release piston.

In order to fix the spring element 24a in the cutout 140a, the body portion 200a has two leaf spring portions 202a which project out of the body portion plane and hook into the cutout 140a behind an annular shoulder 204a of the measurement piston 18a and accordingly axially secure the spring element 24 in the cutout 140a of the measurement piston 18a. The body portion 200a has spring portions 206a at its inner end which must be overcome when the spring element 24a is mounted in the cutout 140a and which then pretension the leaf spring portions 202a in elastic engagement with the annular shoulder 204a, so that the spring element 24a is held in the cutout 140a without play. The spring element 24a is reliably held in a defined middle position relative to the measurement piston 18a by the leaf spring portions 202a and the dimension b of the body portion 200a which are adapted to the dimensions of the cutout 140, wherein close tolerances can be adhered to.

The spring element 24b shown in FIGS. 8 to 10 differs from the spring element 24a primarily in that a spring tube portion 220b is provided instead of the flat body portion 200a and serves to anchor the spring element in the cutout 140b of the measurement piston 18b. With reference to FIG. 10, the spring tube portion 220b is snapped in behind an annular shoulder 222b of the measurement piston 18b in the cutout 140b and contacts the inner circumferential surface of the measurement piston 18b under radial pretensioning in order to hold the spring element 24b in the cutout 140b so as to be essentially free from play. The fact that an annular inclined surface 224b is formed at the measurement piston 18b by which the spring pipe portion 220b is elastically pretensioned in the direction of contact against the annular shoulder 222b also contributes to this absence of play. The spring element is reliably held in a middle position in relation to the measurement piston 18b by the spring tube portion 220b.

There are many more possible constructions for the spring element producing the tractive force driving engagement and ways in which this spring element can be secured in the measurement piston or at the measurement piston (or generally at the measuring member). For example, a separate retaining ring or the like could also be used for fastening.

Figure 11:
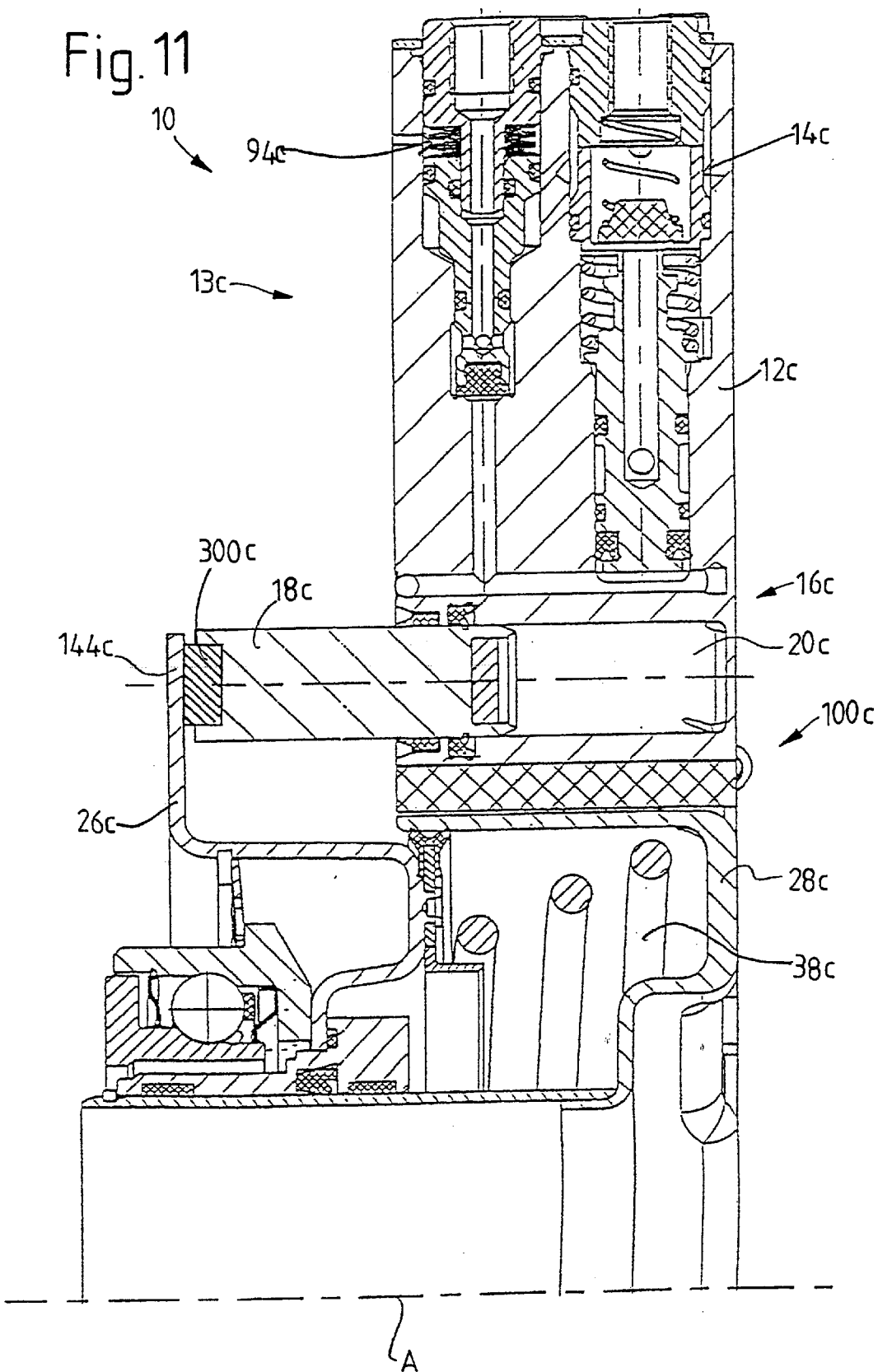
FIG. 11 shows another embodiment form of an actuation device for a motor vehicle friction clutch which corresponds to the embodiment example in FIGS. 1 and 2 with the exception of the type of movement coupling between the measurement piston and pressure medium ring piston.

Instead of a catch coupling connection or snap-in coupling connection between the release piston 26 and the measurement piston 18 which is achieved in the embodiment examples in FIGS. 1 to 10 by means of the spring element 24, 24a or 24b producing the tractive force driving engagement, the movement coupling connection between the release piston 26 and the measurement piston 18 can also be carried out by means of a magnetic force coupling connection. A corresponding embodiment example is shown in FIG. 11. In this case, a magnet element 300c is secured to the free end of the measurement piston 18c (anchored in a cutout of the measurement piston element 18c, for example) which cooperates with the annular flange 144c of the release piston 26c and attracts the magnet element 300c to contact the annular flange 144c through the forces of magnetic attraction and accordingly produces the tractive force driving engagement. For this purpose the release piston 26c must be produced from a correspondingly magnetizable material. Alternatively, another magnet element could also be arranged in a tension-resistant manner on the release piston 26c cooperating with the magnet element 300c.

By using the magnet element or, generally, a magnetic element arrangement, high attractive forces can be achieved, so that a reliable movement coupling connection can be achieved between the measurement piston 18c and the release piston 26c so as to be free from play. A magnetic force coupling is advantageous in that this coupling sets few counterforces in opposition to a relative movement between the magnet element 300c and annular flange 144c in radial or circumferential direction, so that the structural unit 13c can be removed easily in radial outward direction with "automatic" disengagement of the movement coupling connection on the one hand and, on the other hand, rotating movements of the release piston 26c which occur in the course of clutch actuations, possibly induced by the pretensioning spring 38c, or derive from drag torques transmitted via the release bearing are permitted without having to exert excessive tilting moments on the measurement piston 18c which, at worst, could lead to a self-locking of the measurement piston 18c. In order to minimize transverse forces exerted on the measurement piston 18c, the surface of the magnet element 300c contacting the annular flange 144c and/or the surface of the annular flange 144c contacting the magnet element 300c are/is provided with a friction-reducing sliding layer, e.g., a Teflon plate. Corresponding steps are also possible in the embodiment examples of FIGS. 1 to 10.

After removing the structural unit 13c, this exchanged structural unit, or an exchanged structural unit, can be mounted on the release cylinder 28c exactly as in the embodiment examples of FIGS. 1 to 10 before the tractive force driving engagement between the measurement piston 18c and the release piston 26c, and accordingly the movement coupling connection between the latter, is produced by axial relative movement of the measurement piston 18c and annular flange 144c toward one another. For this purpose, it is sufficient that the measurement piston 18c and the annular flange 144c of the release piston 26c approach one another axially until the magnetic forces acting between the magnet element 300c and the annular flange 144c draw the aforementioned components into mutual contact.

The principles of the invention were explained above with reference to an embodiment example in which a command variable defining a reference release or desired release is predetermined by hydraulic means and the actual release is measured by hydraulic means. However, the invention can also be applied in other actuation systems in which at least the actual release is detected in a non-hydraulic manner, e.g., electrically or magnetically. For this purpose, reference is had especially to the preceding remarks regarding the sensor 100. This refers, for example, to actuation systems known as "clutch by wire" in which the reference release is predetermined electrically by means of an electric signal and the actual release is detected by means of an electric sensor, for example, a linear potentiometer or a magnetic sensor (of the same type as sensor 11, for instance). Then, between an input element (e.g., a tappet rod or the like which could have a snap-in or catch spring element or magnet element at one free end) of the electric or magnetic sensor (also describable as measuring member) and an associated mating member, for example, a release piston, there can be provided a movement coupling connection which can be produced along a measurement path in that the measuring member and the mating member approach one another and which comprises a tractive force driving engagement which is essentially free from play. The measuring member can be movement-coupled or can be made movement-coupleable with the mating member by means of a catch coupling connection or snap-in coupling connection acting between the measuring member and the mating member and/or by means of a magnetic force coupling connection acting between the measuring member and the mating member. These inventive principles are completely independent, with respect to the manner of functioning and operation, from the control of the pressure medium force cylinder arrangement, preferably the pneumatic force cylinder arrangement, the master arrangement predetermining the reference release, and the manner of detecting the occurring releasing and engaging movement. In this connection, reference is had to the various possibilities, mentioned in DE 197 16 600 A1, for example, for constructing an actuation device for actuating a friction clutch, specifically to the construction variants contained only in the claims and introductory part of the specification of this Laid Open Application.

It is noted that identical reference numbers are used in the description of the various embodiment examples for identical or similar components with the addition of a lowercase letter identifying the respective embodiment example. The description addresses only the differences in the relation to the embodiment example(s) described in the preceding; in other respects, reference is had expressly to the other embodiment examples.

To summarize, the invention is directed to an actuation device for a friction clutch arranged in the drivetrain of a motor vehicle between a drive unit and a transmission. The actuation device comprises a pressure medium force cylinder arrangement by means of which the friction clutch can be actuated via a release member. According to one feature of the invention, it is suggested for the purpose of producing a movement coupling connection between a measuring member of a measuring arrangement detecting an actual release and an associated mating member whose position represents the actual release that the measuring member and mating member are brought into a tractive force driving engagement so as to be essentially free from play in that the measuring member and the mating member approach one another along a measurement path of the measuring member.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuation device for a friction clutch arranged in a drive train of a motor vehicle between a drive unit and a transmission, said actuation device comprising
   a pressure medium force cylinder,
   a release member which is movable to actuate the clutch in response to actuation of the pressure medium force cylinder,
   a mating member whose position represents a position of the release member, and
   a measuring arrangement having a measuring member which is movable along a measurement path and can be brought into tractive force driving engagement with the mating member by moving said measuring member and said mating member relatively toward each other along said measurement path.

2. An actuation device as in claim 1 further comprising a control/regulating valve arrangement for connecting a pressure medium source to said pressure medium force cylinder, said control regulating valve arrangement acting to control the pressure in said cylinder based on a command variable and a quantity which represents the position of the release member, the position of said mating member representing said quantity, said measuring arrangement detecting said quantity.

3. An actuation device according to claim 1 wherein said measuring arrangement comprises a hydraulic measurement cylinder.

4. An actuation device according to claim 3 wherein said measuring member comprises a measuring piston which is received in said cylinder.

5. An actuation device according to claim 4 further comprising means for ensuring a defined angular position of the measuring piston in said cylinder.

6. An actuation device according to claim 1 wherein said measuring arrangement comprises a sensor which detects said quantity and emits an electric signal, said measuring member comprising an input element of the sensor.

7. An actuation device according to claim 1 further comprising a structural unit having said measuring member, said structural unit being separate from said pressure medium force cylinder.

8. An actuation device according to claim 7 wherein said structural unit is mounted at the pressure medium force cylinder.

9. An actuation device according to claim 7 wherein said structural unit is movable along a mounting path which is transverse to said measurement path for purposes of installation and removal, whereby said tractive force driving engagement can be released by moving said structural unit along said mounting path.

10. An actuation device according to claim 7 wherein said structural unit incorporates said control regulating valve arrangement.

11. An actuation device according to claim 1 wherein said measuring member is connected to said mating member by one of a catch coupling connection and a snap-in coupling connection to effect said tractive driving force engagement.

12. An actuation device according to claim 11 wherein said one of said catch coupling connection and said snap-in coupling connection comprises a spring element which is fixed to one of said measuring member and said mating member and engages a mating engagement element of the other of said measuring member and said mating member with one of a locking engagement and a snap-in connection, said spring element being elastically pretensioned to provide the essentially play free tractive force driving engagement.

13. An actuation device according to claim 12 wherein said measuring member comprises a cutout which opens toward said mating member and receives said spring element therein in one of catching or snap-in engagement, said mating member having said mating engagement element, said spring element having an engagement portion which projects toward the mating member and engages said mating engagement element.

14. An actuation device according to claim 12 wherein said measuring member has an end portion proximate to said mating member, said mating member having said mating engagement element, said spring element being fixed to said end portion and having an engagement portion which engages behind said mating engagement element.

15. An actuation device according to claim 12 wherein said spring element has a snap-ring fastening portion which engages the measuring member.

16. An actuation device according to claim 13 wherein said cutout has an inner surface with a holding shoulder, said spring element comprising a flat body portion defined in a first lateral direction by a pair of side edges which act at said inner surface and at least one leaf spring portion extending from said body portion in a second lateral direction and engaging said holding shoulder.

17. An actuation device according to claim 16 wherein said body portion has an end spring portion remote from said engagement portion, which end spring portion elastically pretensions the body to produce an elastic engagement of the leaf spring portion with the holding shoulder.

18. An actuation device according to claim 13 wherein said cutout has an inner surface with a holding shoulder, said spring element comprising a spring tube portion which is radially pretensioned against said inner surface and is snapped in behind said holding shoulder.

19. An actuation device according to claim 18 wherein said inner surface of said cutout comprises an inclined surface, said spring tube portion engaging said inclined surface to elastically pretension the spring pipe portion toward said holding shoulder.

20. An actuation device according to claim 13 further comprising means for ensuring a defined angular position of said spring element in said cutout of said measuring member.

21. An actuation device according to claim 1 wherein said measuring member is connected to said mating member by a magnetic force coupling connection.

22. An actuation device according to claim 21 wherein said magnetic force coupling connection comprises a magnet element fixed to one of said measuring member and said mating member, and a magnetically attractable portion on the other of said measuring member and said mating member, thereby providing the tractive force driving engagement which is free from play.

23. An actuation device according to claim 22 wherein at least one of said magnet element and said magnetically attractable portion has a sliding surface where said magnet element and said magnetically attractable portion engage each other.

* * * * *